US011200078B1

(12) United States Patent
Tan et al.

(10) Patent No.: US 11,200,078 B1
(45) Date of Patent: Dec. 14, 2021

(54) FACILITATING USE OF AN UNFAMILIAR COMMAND LINE TOOL VIA A FAMILIAR COMMAND LINE TOOL

(71) Applicant: International Business Machines Corporation, Armonk, NY (US)

(72) Inventors: Fei Tan, Beijing (CN); Jiu Chang Du, Beijing (CN); Zhan Peng Huo, Beijing (CN); Lu Yan Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/091,284

(22) Filed: Nov. 6, 2020

(51) Int. Cl.
*G06F 9/455* (2018.01)
*G06F 3/0484* (2013.01)

(52) U.S. Cl.
CPC ........ *G06F 9/45512* (2013.01); *G06F 3/0484* (2013.01)

(58) Field of Classification Search
CPC ............................ G06F 9/45512; G06F 3/0484
See application file for complete search history.

(56) References Cited

U.S. PATENT DOCUMENTS

| | | | |
|---|---|---|---|
| 9,002,997 B2* | 4/2015 | Kowalski | H04L 67/42 709/220 |
| 10,069,942 B2* | 9/2018 | Jiang | H04L 41/0813 |
| 10,235,353 B1* | 3/2019 | Sanders | G06F 40/211 |
| 10,929,415 B1* | 2/2021 | Shcherbakov | G06F 16/26 |
| 10,999,164 B1* | 5/2021 | Sridhar | H04L 41/20 |
| 11,029,802 B2* | 6/2021 | Zhao | G06F 8/38 |
| 11,113,294 B1* | 9/2021 | Bourbie | G06F 16/2448 |
| 11,134,123 B2* | 9/2021 | Skaaksrud | A62C 31/22 |

(Continued)

FOREIGN PATENT DOCUMENTS

| | | |
|---|---|---|
| CN | 1889442 A | 6/2006 |
| CN | 107315830 A | 7/2017 |

OTHER PUBLICATIONS

AI Research, "CLAI is an open-sourced project that aims to bring the power of AI to the command line" https://clai-home.mybluemix.net/ (retrieved Nov. 6, 2020), 1 page.

(Continued)

*Primary Examiner* — David Phantana-angkool
(74) *Attorney, Agent, or Firm* — Cantor Colburn LLP; Margaret McNamara

(57) ABSTRACT

A method of translating a first command to a target command includes receiving the first command in a first command format, acquiring a first utility intermediate representation framework (UIRF) including a plurality of a first set of node instances. The method also includes acquiring a first user utility intermediate representation framework (UUIRF) by parsing the first command into one or more command elements, representing each command element by a respective node instance of the first UIRF, the first UUIRF representing an intention of the first command, acquiring a target UUIRF based on a target format, the target UUIRF including a target set of node instances, entering information from each of the first set of node instances of the first UUIRF into a corresponding node instance of the target set of node instances in the target UUIRF, and constructing the target command based on the target UUIRF.

20 Claims, 12 Drawing Sheets

(56) References Cited

U.S. PATENT DOCUMENTS

2015/0019199 A1  1/2015  Andrews et al.
2019/0386891 A1* 12/2019 Chitalia .................. H04L 41/22
2021/0026917 A1*  1/2021  Asturias .................. H04L 41/22

OTHER PUBLICATIONS

Bing et al."Approach of Structured Information Extractions for Medical Text Data" Journal of Chinese Computer Systems, vol. 40, No. 7, 2019 (Year: 2019), pp. 1479-1485.
Henry-Stocker, Sandra, "The Linux command that you should never say out loud" Network World, https://www.networkworld.com/article/3069981/the-linux-command-that-you-should-never-say-out-loud.html. (Retrieved Nov. 6, 2020) 2 pages.
IonY "MSYS", MingW ,http://www.mingw.org/wiki/msys, published Jan. 18, 2008, (Year: 2008), 18 pages.
Piotr Gaczkowski "Command Line Tools for Developers" Developers, https://www.toptal.com/software/best-command-line-tools. (Retrieved Nov. 6, 2020), 2 pages.
Python.org, "optparse—Parser for command line options" https://docs.python.org/3/library/optparse.html (Retrieved Nov. 6, 2020), 41 pages.
Robin Coe, "Tips for seamlessly using Cygwin and WSL in Windows 10" Medium.com, https://medium.com/@rcoe67/tips-for-seamlessly-using-cygwin-and-wsl-in-windows-10-9ed1a72ace6c Authors: Robin Coe. Jan. 3, 2019. (Year: 2019), 7 pages.

* cited by examiner

FACILITATING USE OF AN UNFAMILIAR COMMAND LINE TOOL VIA A FAMILIAR COMMAND LINE TOOL

BACKGROUND

The present invention generally relates to computer systems, and more specifically, to the use of command line tools and transformations between commands having different command formats.

User interfaces are important aspects of many software programs, tools, services and other computing devices, systems or units. Graphical user interfaces (GUIs) allow a user to issue a command by making selections using a mouse or other pointer. Other interfaces include command line interfaces presented by, e.g., command line tools, in which commands are textually entered by a user. Many applications include command line tools or other components, as manually entering commands can be more direct and flexible than GUIs.

There are many command line tools that are provided for a wide variety of purposes, and that support different command formats. In some cases, a user may wish to enter commands in a format that is unfamiliar to the user. Thus, the manual entering of commands may require users to familiarize themselves with different and possibly unfamiliar formats.

SUMMARY

Embodiments of the present invention are directed to a computer-implemented method of translating a first command to a target command. The method includes receiving, by a processor, the first command entered into a command line tool in a first command format via a user interface, the first command requesting an operation, the processor configured to translate the first command into the target command, the target command configured to request the operation and having a target format, and acquiring a first utility intermediate representation framework (UIRF) corresponding to the command line tool, the first UIRF including a plurality of a first set of node instances, where a command element associated with the first command format is representable by one or more node instances of the plurality of the first set of node instances. The method also includes acquiring a first user utility intermediate representation framework (UUIRF) by parsing the first command into one or more command elements, and representing each command element of the one or more command elements by a respective node instance of the first set of node instances of the first UIRF, the first UUIRF representing an intention of the first command, acquiring a target UUIRF, the target UUIRF based on the target format, the target UUIRF including a target set of node instances, entering information from each of the first set of node instances of the first UUIRF into a corresponding node instance of the target set of node instances in the target UUIRF, and constructing the target command based on the target UUIRF, the target command representing the intention of the first command.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
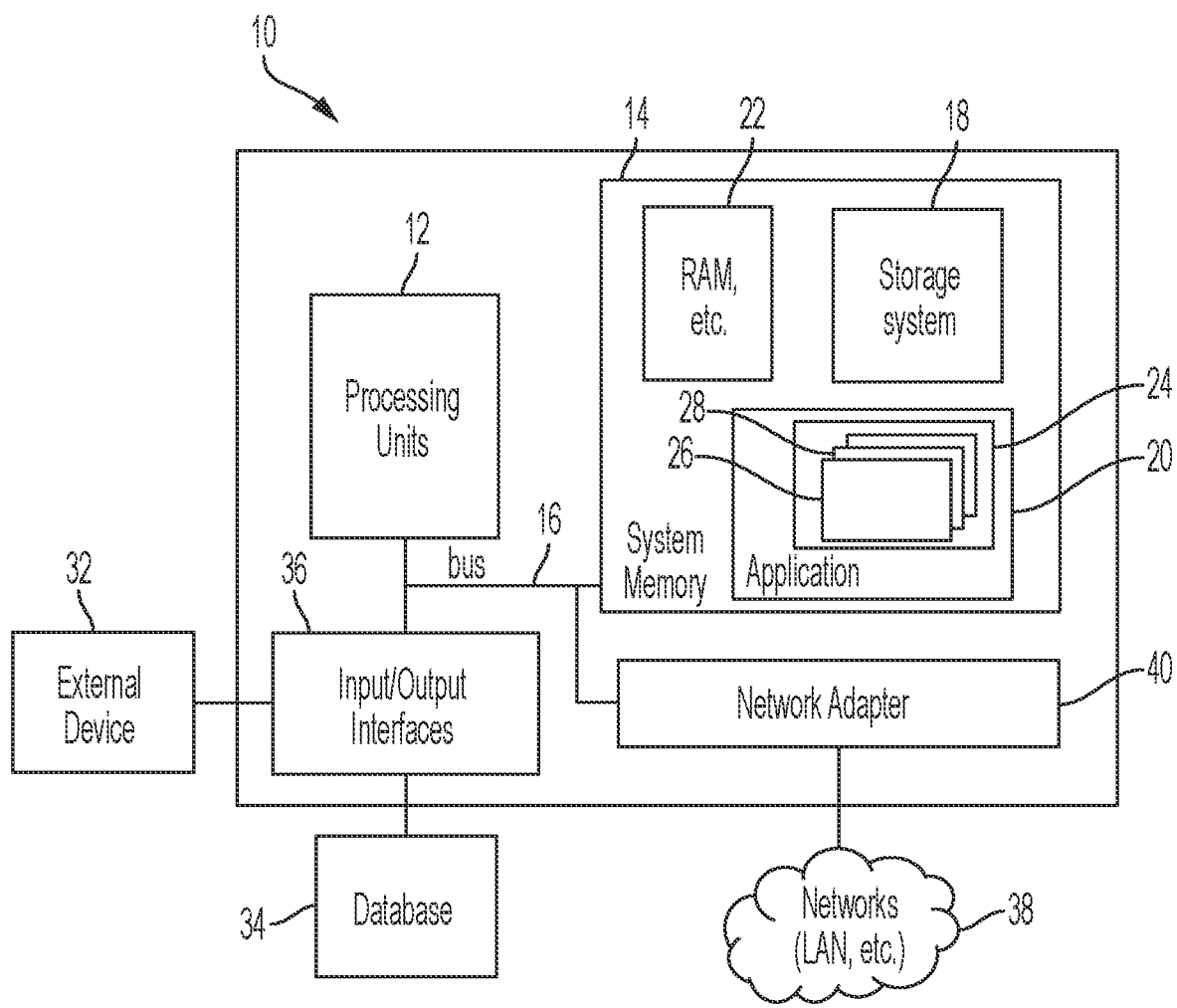
FIG. 1 is a block diagram of components of a computer system that includes functionality related to transforming a command line from a first command format to a second command format using an intermediate representation framework (IRF), in accordance with one or more embodiments of the present invention.

Systems, devices and methods are provided for facilitating the transformation of command lines between various command formats. The systems, devices and methods are configured to transform a command entered in a command line tool in a first command format into a second command format. A "command line tool" may be any service, tool, processing unit, program or other computing device or unit that is capable of reading textual commands entered by a user.

The first command format, in one embodiment, is a format familiar to a user, and the second command format is unfamiliar to the user. An embodiment of a system is configured to construct and/or maintain an intermediate representation framework (IRF) that is used to transform a command entered by a user according to a familiar format into an unfamiliar format. A "format" of a command line refers to the specific grammar, syntax and other values and value patterns features prescribed and format used to relay the intentions of a command. A "familiar" command format is a format that a user has knowledge of, such that the user can enter a proper command according to the format. An "unfamiliar" command format is a format that the user is unable to use properly at the time the user enters a command.

The IRF provides a structure that prescribes how to interpret command line tools using a plurality of hierarchical layers. The IRF represents a general framework for representing tools or services in a multi-layer framework. In one embodiment, the IRF includes category layers in which specific command line tools are organized by common sets of functions and capabilities. For each tool in a category layer, the framework includes a group layer in which specific tool functions are represented as respective group elements. For each group element, the IRF provides one or more node templates, in which "atomic units" of a command can be represented. Each node template in the node layer provides an abstract description of an atomic unit, so that atomic units specific to an entered command can be entered to create a node instance. An "atomic unit" is an irreducible component of a command, or a specific command element, such as a command name, a command option and/or a command argument.

The system can create and store an IRF for a given tool set (collection of command line tools), which can be used to translate commands in a variety of different command formats. The IRF can be stored or retained in any suitable format. In one embodiment, the IRF is stored in a format that is independent of specific command formats.

In order to transform a command entered into a command line tool from a first format to a second or target format, a subset of the IRF is extracted that represents the specific command line tool. This subset is referred to as a utility intermediate representation framework (UIRF). The UIRF for a given tool includes the category in which the tool was classified, the group element(s) representing available tool functions and, and node templates associated with each group element.

The system then parses the entered command into the individual values or elements making up the command. For example, the entered command is parsed into command elements (atomic units) including the command name, function or functions (option or options) and argument or arguments. Each command element is entered into a corresponding node template, creating a node instance specific to the command. Each node instance represents an element of the command and the intention of the element. The result is an instance of the framework that represents the specific entered command, referred to as a user utility intermediate representation (UUIRF).

The system also generates a UIRF for the target format. The target UIRF is organized similarly to the first UIRF, but has node templates according to the target command format. The system then generates a UUIRF for a corresponding command in the second format, which includes node instances corresponding to elements of the target command. Information from the UUIRF associated with the first command (the first UUIRF) is entered into the UUIRF associated with the target command (the target UUIRF).

To complete the translation, the system utilizes the target UUIRF to create command elements specific to the target format. In this way, the target UUIRF is used to re-create the intention of the first command by way of the target command.

In one embodiment, the system is configured to analyze the effectiveness of the transformation and generate a score therefrom. The score may be generated by assigning a weight value to each node instance (e.g., based on priority of the function associated with the node instance), and combining the weight values to calculate a score for assessment.

Embodiments of the invention described herein provide a number of technical benefits and effects. For example, systems and computer-implemented methods in accordance with aspects of the invention utilize a framework that allows for quick and efficient command transformations. Embodiments described herein provide a way for a user to input command lines in a protocol unfamiliar to the user, by allowing the user to enter commands in a familiar protocol. An operating system or platform or program may support a number of command protocols; however, there are many protocols available that may not be supported. Embodiments described herein provide an intuitive way for a user to utilize unfamiliar protocols without the need for reprogramming an existing system or platform or requiring the user to learn new protocols.

FIG. 1 depicts an example of a computer device 10 that may be used to perform functions described herein. Components of the computer device 10 include one or more processors or processing units 12, a system memory 14, and a bus 16 that couples various system components including the system memory 14 to the one or more processing units 12. The system memory 14 may include a variety of computer system readable media. Such media can be any available media that is accessible by the one or more processing units 12, and includes both volatile and non-volatile media, removable and non-removable media.

For example, the system memory 14 includes a storage system 18 for reading from and writing to a non-removable, non-volatile memory 20 (e.g., a hard drive). It is noted that the storage system 18 is not so limited, and can be disposed within the device 10 and/or externally (e.g., in a database). The system memory 14 may also include volatile memory 22, such as random access memory (RAM) and/or cache memory. The computer device 10 can further include other removable/non-removable, volatile/non-volatile computer system storage media.

As will be further depicted and described below, the system memory 14 can include at least one program product having a set (e.g., at least one) of program modules that are configured to carry out the functions of embodiments of the invention.

For example, the system memory 14 stores an application 24 or components thereof. The application 24 may include one or more application programs, program modules, and/or program data. Program modules of the application 24 generally carry out the functions and/or methodologies of embodiments described herein.

For example, the program modules include an input module 26 configured to receive data such as user commands. The program modules can also include a translation module 28. Additional components may be incorporated into the translation module 28 or stored as separate modules or processing units, such as a user interface, a parser, a file (or other data structure) manager and others.

The one or more processing units 12 can also communicate with one or more external devices 32 such as a keyboard, a pointing device, a display, and/or any devices (e.g., network card, modem, etc.) that enable the one or more processing units 12 to communicate with one or more other computing devices. In addition, the one or more processing units 12 can communicate with an external storage device such as a database 34. Such communication can occur via Input/Output (I/O) interfaces 36. Other interfaces might include application programming interfaces (APIs) not shown here.

The database may be used to store data and information related to embodiments described herein. For example, the database 34 (or other suitable local or remote storage location) can store an IRF that can be used for one or more command tool sets, UIRFs for specific command line tools, user registration data, documentation and other information describing various command tools and command formats associated therewith, and/or other aspects of a representation framework discussed herein. The one or more processing units 12 can also communicate with one or more networks 38 such as a local area network (LAN), a general wide area network (WAN), and/or a public network (e.g., the Internet) via network adapter 40. The processing units 12 can also communicate wirelessly via, for example, a Bluetooth connection or the like. It should be understood that although not shown, other hardware and/or software components could be used in conjunction with the computing system 10. Examples, include, but are not limited to microcode, device drivers, redundant processing units, external disk drive arrays, RAID systems, tape drives, and data archival storage systems, etc.

Figure 2:
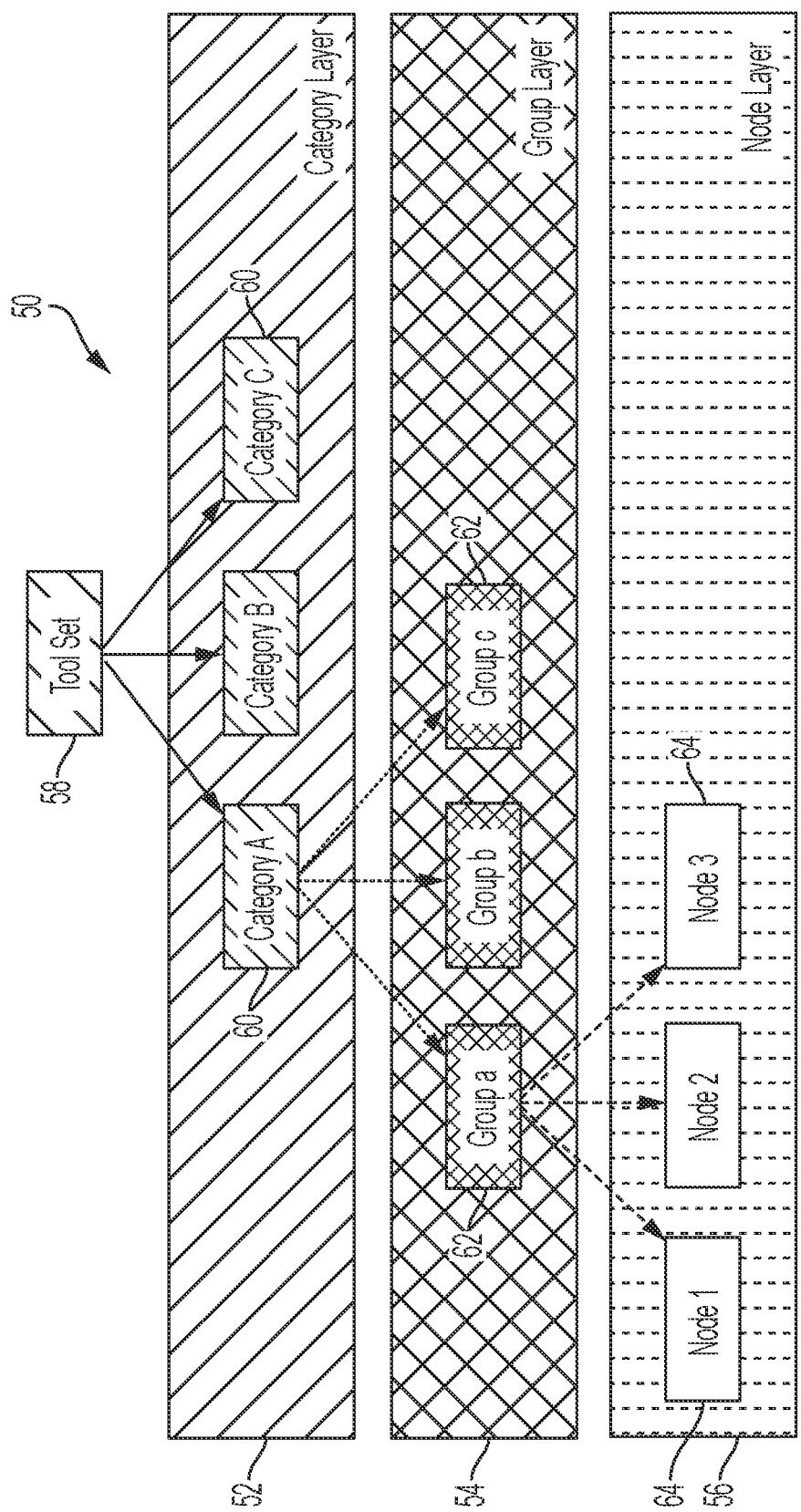
FIG. 2 depicts the IRF of FIG. 1, including a plurality of representation layers for a set of command line tools, in accordance with one or more embodiments of the present invention.

FIG. 2 depicts a generic example of an intermediate representation framework (IRF) 50, which includes a category layer 52, a group layer 54 and a node layer 56. To create an IRF for a tool set 58 (a set of one or more command line tools) that operates according to a given command format, individual tools in the tool set 58 are categorized by type into category elements 60. For each category element 60, the group layer includes one or more group elements 62. Each group element 62 represents common functions and attributes within a related category.

For each group element 62, one or more node templates 64 are provided. A node template 64 is provided for each of the available command elements. At this point, the node templates 64 do not include specific details of a particular command, but instead provide a structure in which the atomic units (command options and parameters) of an entered command can be represented.

The following examples and embodiments are described in conjunction with two examples of command line formats. The first format is a "tar" command format for collecting, distributing and archiving files in a tar file format. The second format is a "pax" command format, which is used to archive files in various archive formats. These examples are provided for illustrative purposes and are not intended to be limiting, as the IRF 50 can be utilized for any of a variety of command types and formats.

FIGS. 3-6 illustrate an example of the IRF 50 and illustrate the use of the IRF for an example of the tool set 58.

Figure 3:
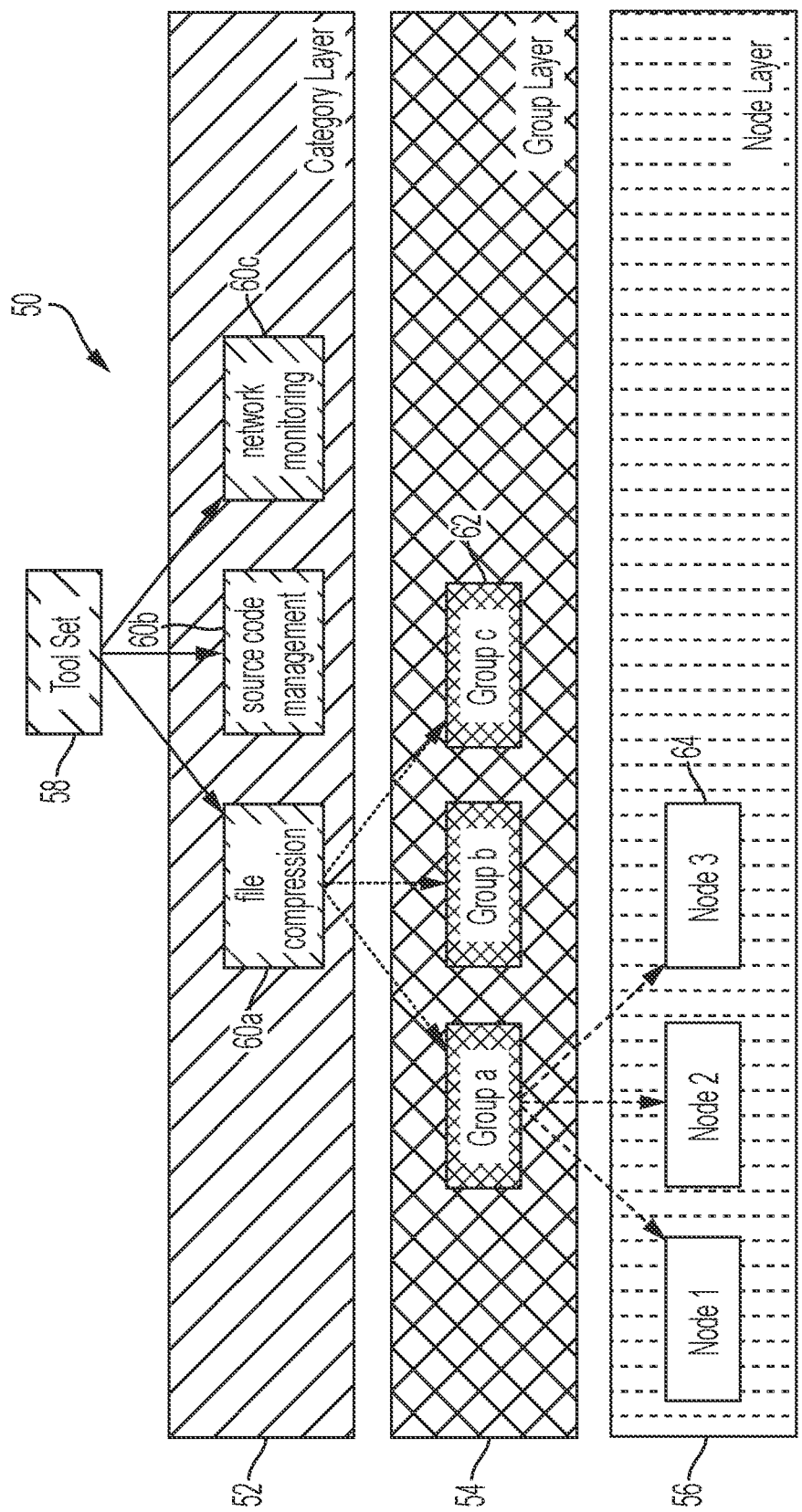
FIG. 3 depicts the IRF of FIG. 2 in conjunction with an example of a set of command line tools, in accordance with one or more embodiments of the present invention.
Figure 4:
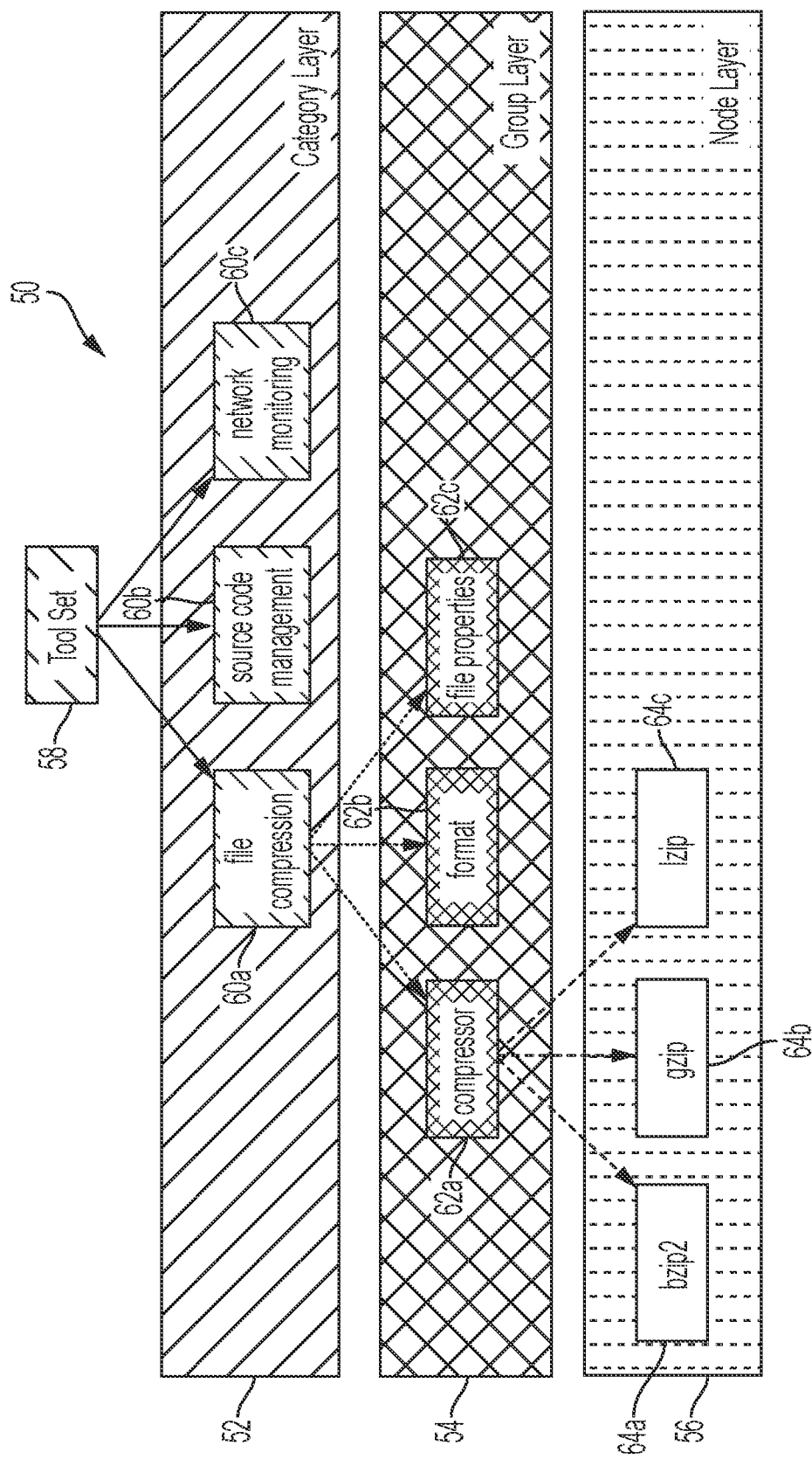
FIG. 4 depicts the IRF of FIG. 3 and illustrates an example of a group layer and a node layer, in accordance with one or more embodiments of the present invention.

Referring to FIG. 3, individual tools in the tool set 58 are categorized into a "file compression" category 60a, a "source code management" category 60b and a "network monitoring" category 60c. Referring to FIG. 4, the tools in the file compression category are organized in the group layer as a "compressor" element 62a for compressor functions, a "format" element 62b for formatting functions and a "file properties" element 62c. The compressor element 62a is provided with node templates for various command elements. In this example, one node template denoted as a "bzip2" template 64a is provided for a command option to read or write archives using a bzip2 compressor. The node templates denoted "gzip" template 64b and "lzip" template 64c are provided for command options to read or write archives using a gzip compressor and a lzip compressor, respectively.

Figure 5:
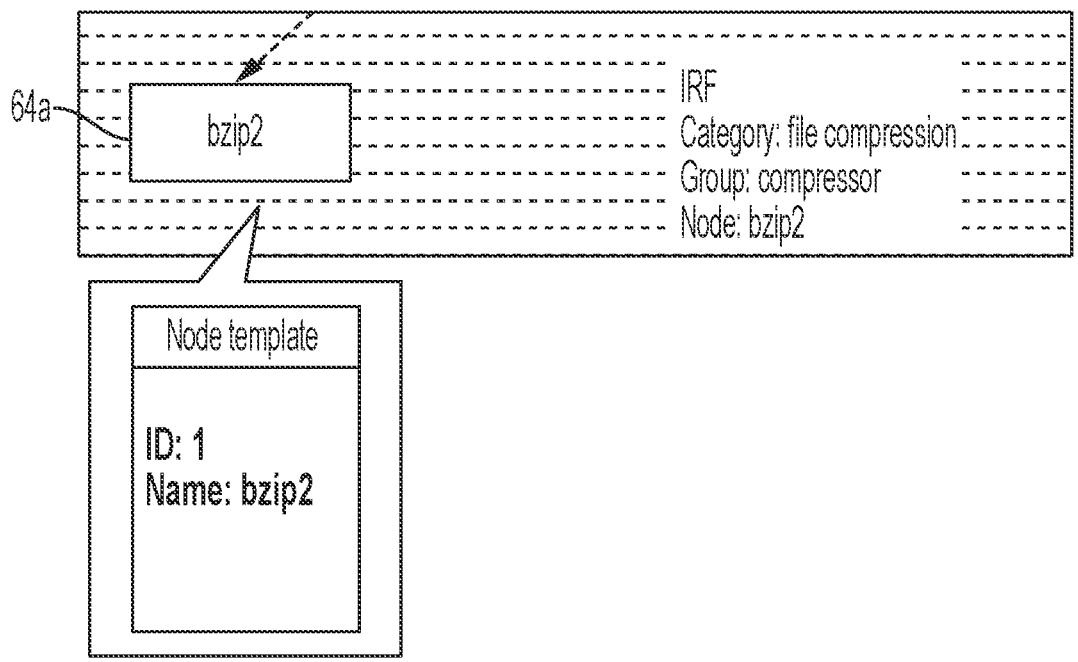
FIG. 5 depicts an example of a node template of the IRF of FIGS. 3 and 4, in accordance with one or more embodiments of the present invention.
Figure 6:
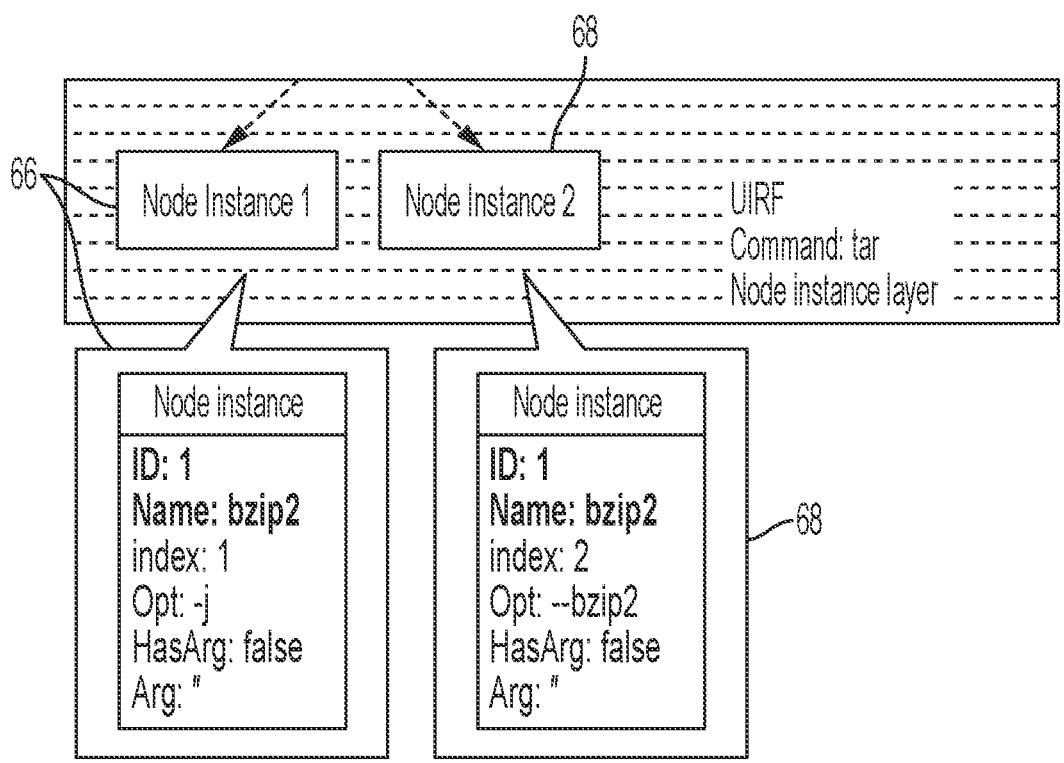
FIG. 6 depicts examples of node instances created for an example of a command format, in accordance with one or more embodiments of the present invention.

FIG. 5 shows an example of the "bzip" node template 64a. The node 64a includes an identifier (ID) unique to the node template 64a, and a name indicative of the function or attribute of a command element. As shown in FIG. 6, to generate a UIRF for a tar command format, the node template 64a is used to create node instances 66 and 68. Each of the node instances 66 and 68 have the same ID and name as the node template 64a, and include various entries for specifying attributes of tar command elements for archiving files using bzip. These entries include an index entry, an option ("opt") entry for specifying a command option, and entries for entering information related to command argument. A "HasArg" entry indicates whether there is an argument for this command element, and an "Arg" entry for specifying an actual argument value. In this example, the node instance 66 specifies a "-j" option that indicates using bzip2 algorithm when writing to or extracting an archive, and node instance 68 indicates the same but using a different option "--bzip2".

Figure 7:
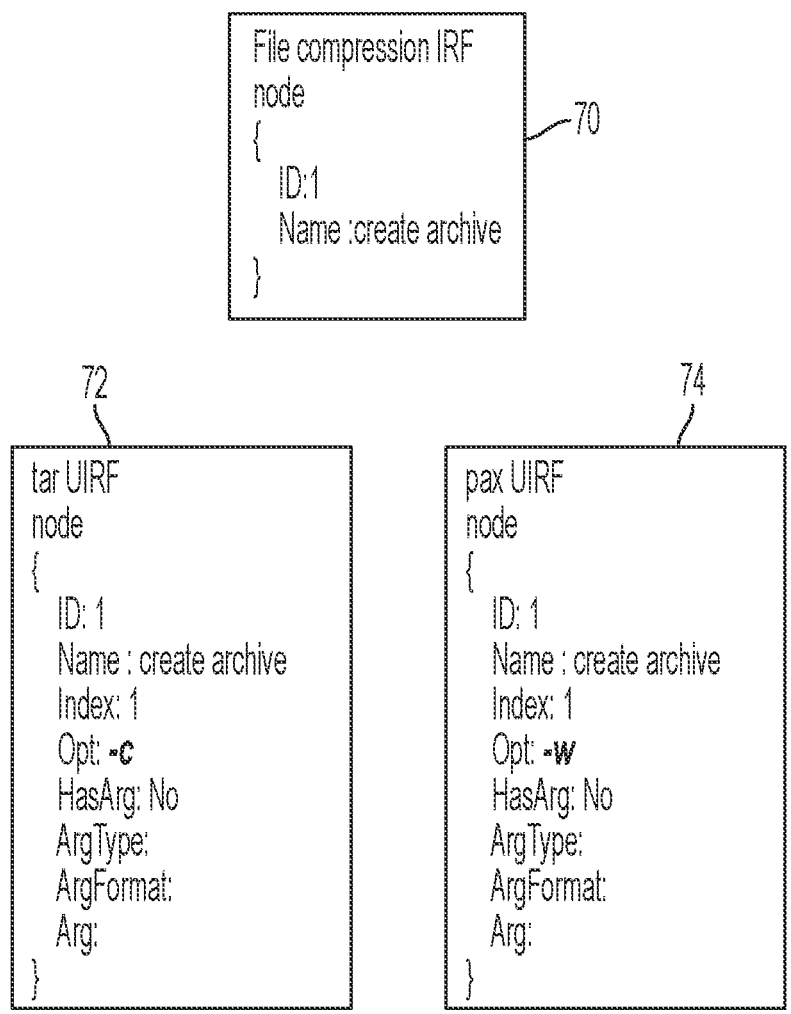
FIG. 7 depicts an example of a node in an IRF node layer, and also illustrates an example of node instances created for different command formats, in accordance with one or more embodiments of the present invention.

FIG. 7 shows an example of a format of a node template 70 in a node layer of the IRF 50, such as the IRF category 60a. The node template 70 includes an identifier (ID) unique to the node template 70, and a name indicative of the function or attribute of a command element. In order to perform a translation between a first command in a first format to a target command in a second format, a first UIRF is derived for the first format, and a second UIRF is derived for the second format.

If the first format is a tar command format, a tar UIRF is created by selecting and extracting the appropriate category element, group element and node templates associated with tar commands. The node template 70 is extracted and used to generate a node instance 72. The node instance 72 includes various entries for specifying attributes of a tar command element. These entries include an ID entry, a name entry, an index entry, and an option ("opt") entry for specifying a command option. Other entries include entries for entering information related to command argument, include a "HasArg" entry, an "ArgType" entry for entering argument type, and an "Arg" entry for specifying an actual argument value. In this example, the node instance 72 of the tar UIRF specifies a "-c" option, which indicates creating a new archive.

If the target format is a pax command format, a pax UIRF is created, which includes a node instance 74 created from the node template 70. The node instance 74 includes similar entries as the node instance 72; however, the option specified is a "-w" option for the pax command, indicating that data is to be written to an archive.

Figure 8:
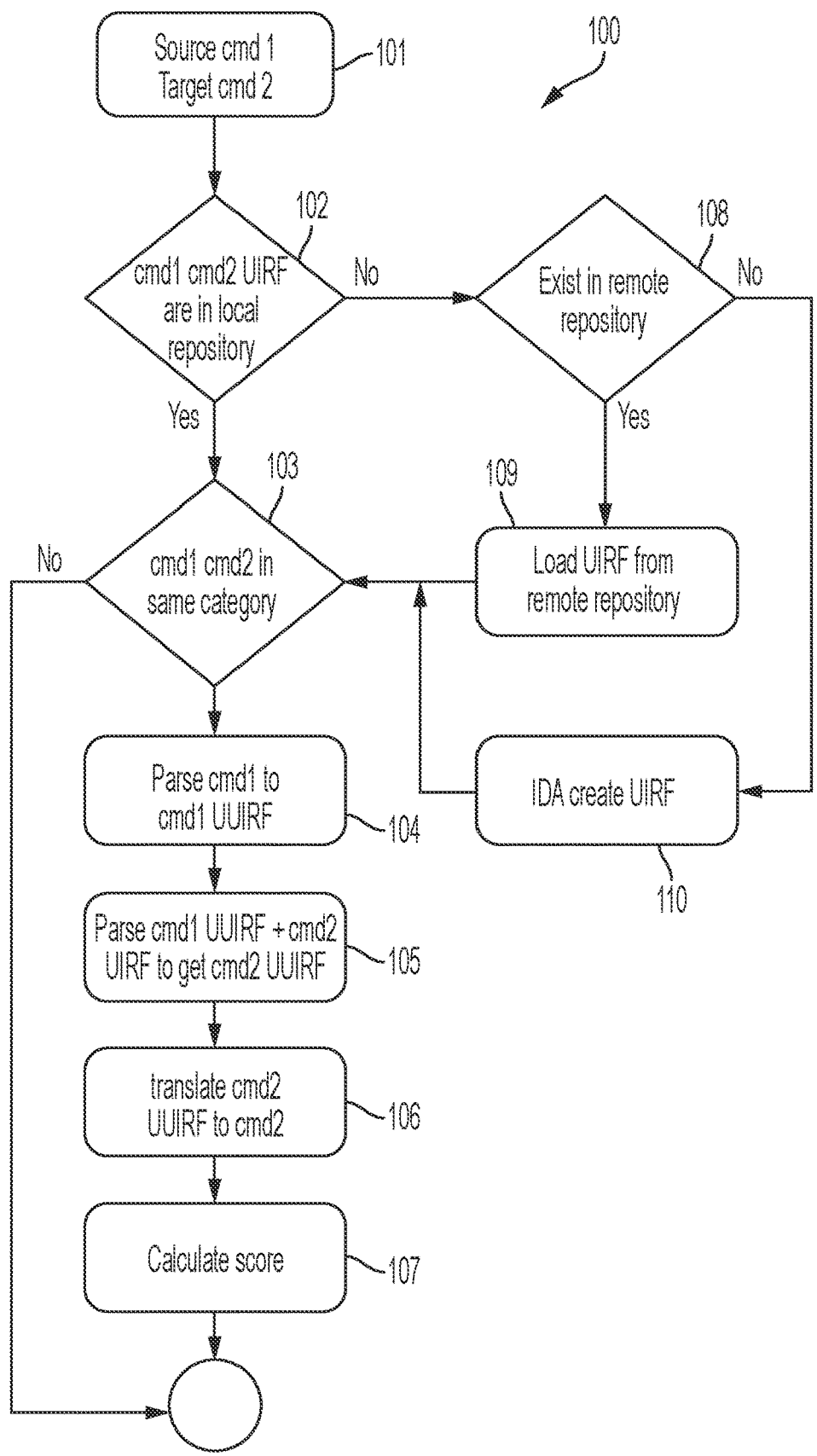
FIG. 8 is a flow diagram of a method of transforming a command entered by a user from a first format to a second format, in accordance with one or more embodiments of the present invention.

FIG. 8 is a flow diagram that depicts an embodiment of a method 100 of transforming an entered command from a first format to a target format. The method 100 may be performed by a processor, OS or other suitable application or program. Although the method 100 is discussed in conjunction with the computer system 10, the method 100 is not so limited. The method 100 is discussed in conjunction with blocks 101-110. The method 100 is not limited to the number or order of steps therein, as some steps represented by blocks 101-110 may be performed in a different order than that described below, or fewer than all of the steps may be performed.

At block 101, a user enters a command (denoted "cmd1") in a first format, also referred to as a source format. The user may request that the entered command be transformed into a desired format, referred to as a target format. Alternatively, the computer system 10 can automatically identify the source format, and determine that the command should be entered in the target format.

The system 10 determines whether a UIRF is available for the cmd1 and the cmd2. UIRFs may be pre-existing, for example, constructed initially for specific tools and tool sets by acquiring tool information from developers via active registration of the tools and tool sets. Alternatively, the computer system 10 can automatically generate UIRFs for specific tools by analyzing business documents (tool documentation) and any other available relevant information.

For example, at block 102, the processor inspects a local repository and acquires the UIRF for cmd1 (referred to as "UIRF-1") and/or the UIRF for cmd2 (referred to as "UIRF-2"), if stored therein.

At block 103, if both UIRFs are in the local repository, the system 10 loads the UIRFs and determines whether the entered command and the target command are in the same category. If the commands are not in the same category, the system 10 stops the method and may provide an alert, message or other indication to the user.

At block 104, cmd1 is parsed into command elements, and the command elements are entered into corresponding node elements in the UIRF-1 to generate a user utility intermediate representation framework (UUIRF) for the entered command. The UUIRF for cmd1 is referred to as the "UUIRF-1." The UUIRF-1 describes the intention of cmd1. For example, cmd1 is parsed to isolate command elements such as the command name, command options and arguments.

At block 105, the parsed claim elements are correlated to corresponding node instances in the UIRF-2. In other words, the intention of each command element in cmd1 is identified, and the corresponding node instance in UIRF-2 are identified. The identified node instances of UIRF-2 are used to generate a UUIRF for cmd2, referred to as "UUIRF-2."

At block 106, the UUIRF-2 is translated to cmd2. The intention of each node instance in the UUIRF-2 is identified and appropriate command elements in the target format are used to construct the target command.

At block 107, in one embodiment, an evaluation process is performed to analyze the translation and determine the accuracy or completeness of the translation. For example, a weight value can be assigned to each node instance in the UUIRF-1 and/or UUIRF-2. Each weight value corresponds to the importance or priority of a function requested by the entered command.

In one embodiment, the weight values of the UUIRF-1 are combined, the weight valued of the UUIRF-2 are combined, and the combined values are compared to calculate a percentage, proportion or other numerical value that is indicative of the accuracy and completeness of the translation.

In some cases, both UIRFs are not available in the local repository. If either or both are not in the local repository, the system 10 at block 108 consults a remote repository (or multiple repositories). At block 109, either or both of the UIRFs are loaded from the remote repository, if available.

At block 110, if either or both UIRFs are not in the repository or are otherwise, the computer system 10 may create either or both UIRFs using, for example, Intelligent Document Analysis (IDA). IDA can be used for document semantic analysis to understand a business document. In addition, the system 10 can perform structured information extraction to automatically generate a UIRF for a tool. For example, an IDA featured with information subtraction functionality can be used to obtain a UIRF using a command's manual guide, or other information regarding command format. Other NLP or machine learning techniques can also be used to act as or facilitate the IDA.

Figure 9:
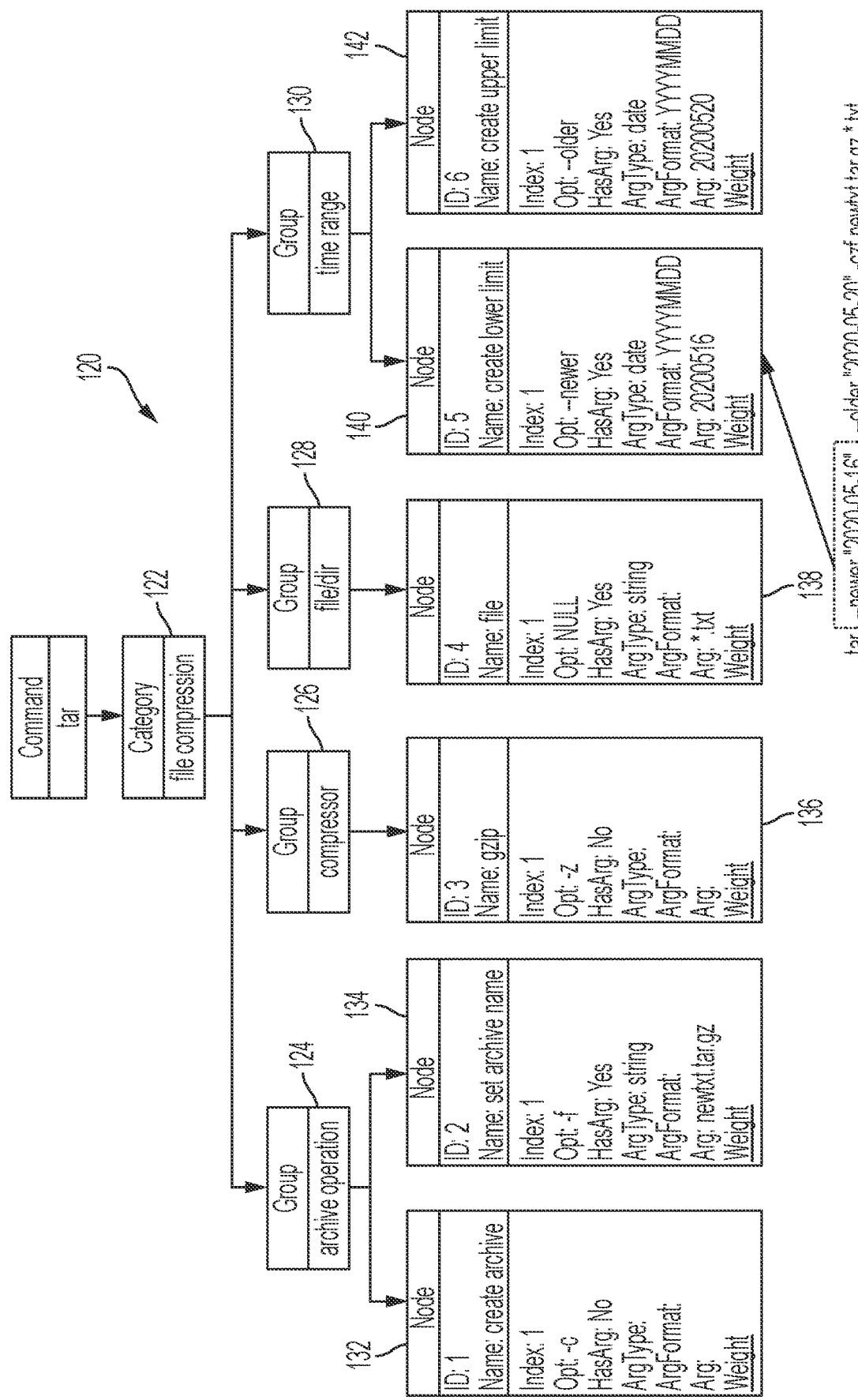
FIG. 9 depicts an example of a first user utility representation framework (UUIRF) created for an example of a command entered in a first format, in accordance with one or more embodiments of the present invention.
Figure 10:
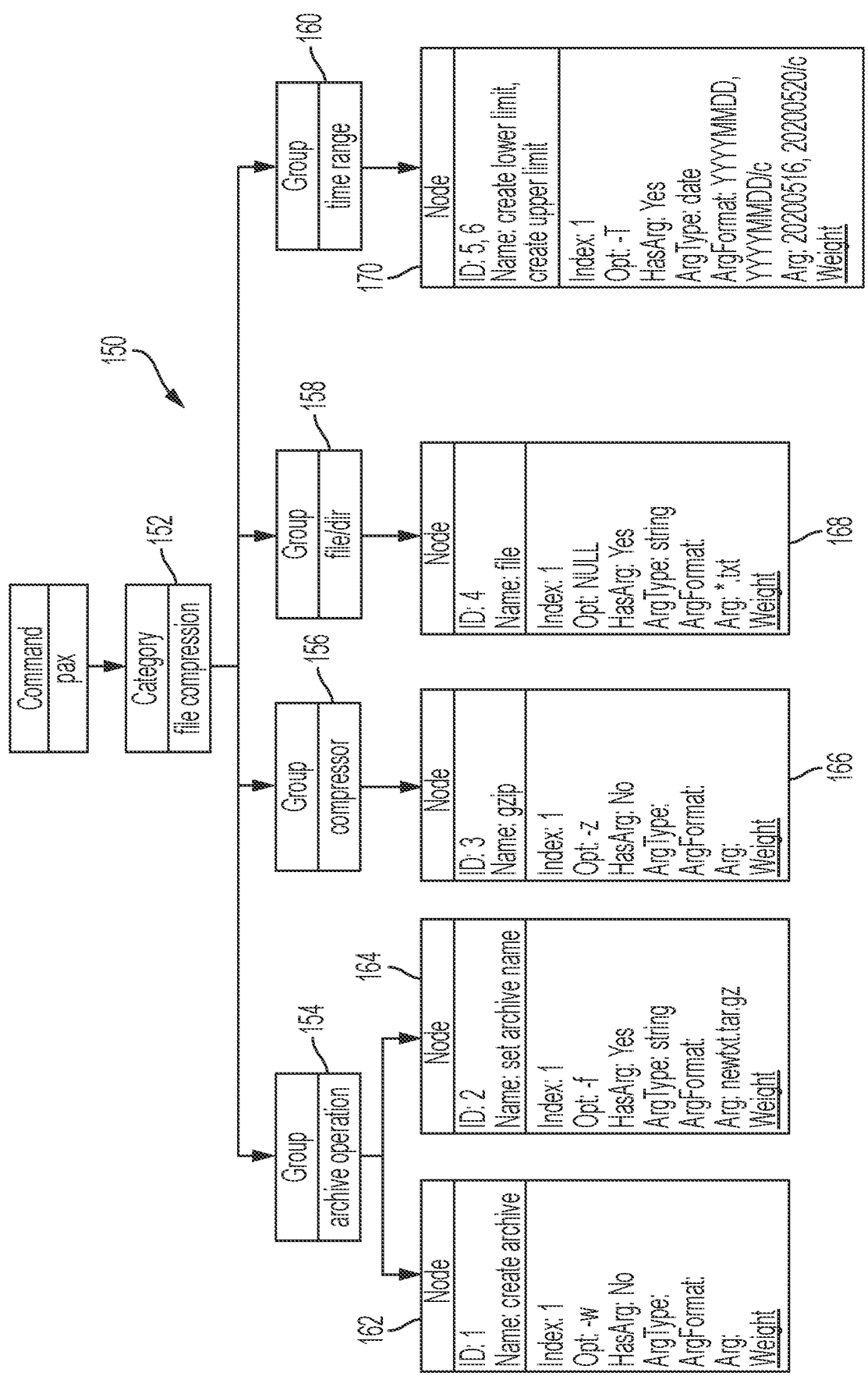
FIG. 10 depicts an example of a target UUIRF created to transform the command of FIG. 9 into a target format, in accordance with one or more embodiments of the present invention.

FIGS. 9 and 10 depict an example of the method 100. In this example, a user is familiar with "tar" commands, and inputs a tar command into a compression tool, and requests that the tar command be translated into a "pax" command. The entered command in this example follows:

tar --newer "2020-05-16"--older "2020-05-20"-czf newtxt-.tar.gz *.txt.

The above command includes the function "-c" that directs the creation of a new archive, the option "-z" to read and write archives through gzip, and "-f" that directs the use of an archive file. The command thus directs a processor to package the .txt files that are newer than May 16, 2020 and older than May 20, 2020 to an archive "newtxt.tar.gz" with gzip.

The user may request the translation by entering a translation command recognized by the system 10. For example, the user requests the translation by entering the command name "cmdTrans," followed by the command line to be translated, and further followed by the requested command format. The request can be formulated as follows:

cmdTrans "tar --newer "2020-05-16"--older "2020-05-20"-czf newtxt.tar.gz *.txt" pax The system 10 either creates an UIRF or acquires an UIRF of the compression tool. From the UIRF, a tar UUIRF 120 is created, which includes a category layer having a category element 122, denoted as "file compression." The category element 122 relates to group elements in a group player, where each group element represents a compression function. In this example, the group layer includes an "archive operation" element 124, a "compressor" element 126, a "file/dir" element 128, and a "time range" element 130.

The command is parsed into individual command elements as atomic units, and entered into corresponding node instances in a node layer of the tar UUIRF 120. A "create archive" node instance 132 including the option "-c" is selected. A "set archive name" node instance 134 including the option "-f" is selected, and the archive name "newtxt-.tar.gz" is entered as the argument. A "gzip" node instance 136 including the option "-z" is also selected, and a "file" node instance 138 is selected and ".txt" is entered as the argument. Lastly, node instances 140 and 142 are selected and the dates are entered therein. In this way, the UUIRF 120 represents the intentions of the entered tar command.

As shown in FIG. 10, a UUIRF 150 is created or acquired for translation into the target pax command. The UUIRF 150 includes a category layer having a "file compression" element 152, and group elements that correspond to the group elements of the tar UUIRF 120. The group elements include an "archive operation" element 154, a "compressor" element 156, a "file/dir" element 158, and a "time range" element 160.

The pax UUIRF 150 includes node instances for each command element of a pax command. The node instances include a "create archive" node instance 162, a "set archive name" node instance 164, a "gzip" node instance 166, a "file" node instance 168, and a node instance 170 for entering the dates specified in the tar command.

The system 10 then constructs the pax command using the information provided in the node instance of the UUIRF 150. For example, using the pax format, the following pax command is generated:
pax -T 2005160000,2005200000/c -wzf mytxt.tar.gz *.txt Both the tar command and the pax command provide for the same functionality and result, i.e., .txt files created in the requested time range were packaged to an archive.

Figure 11:
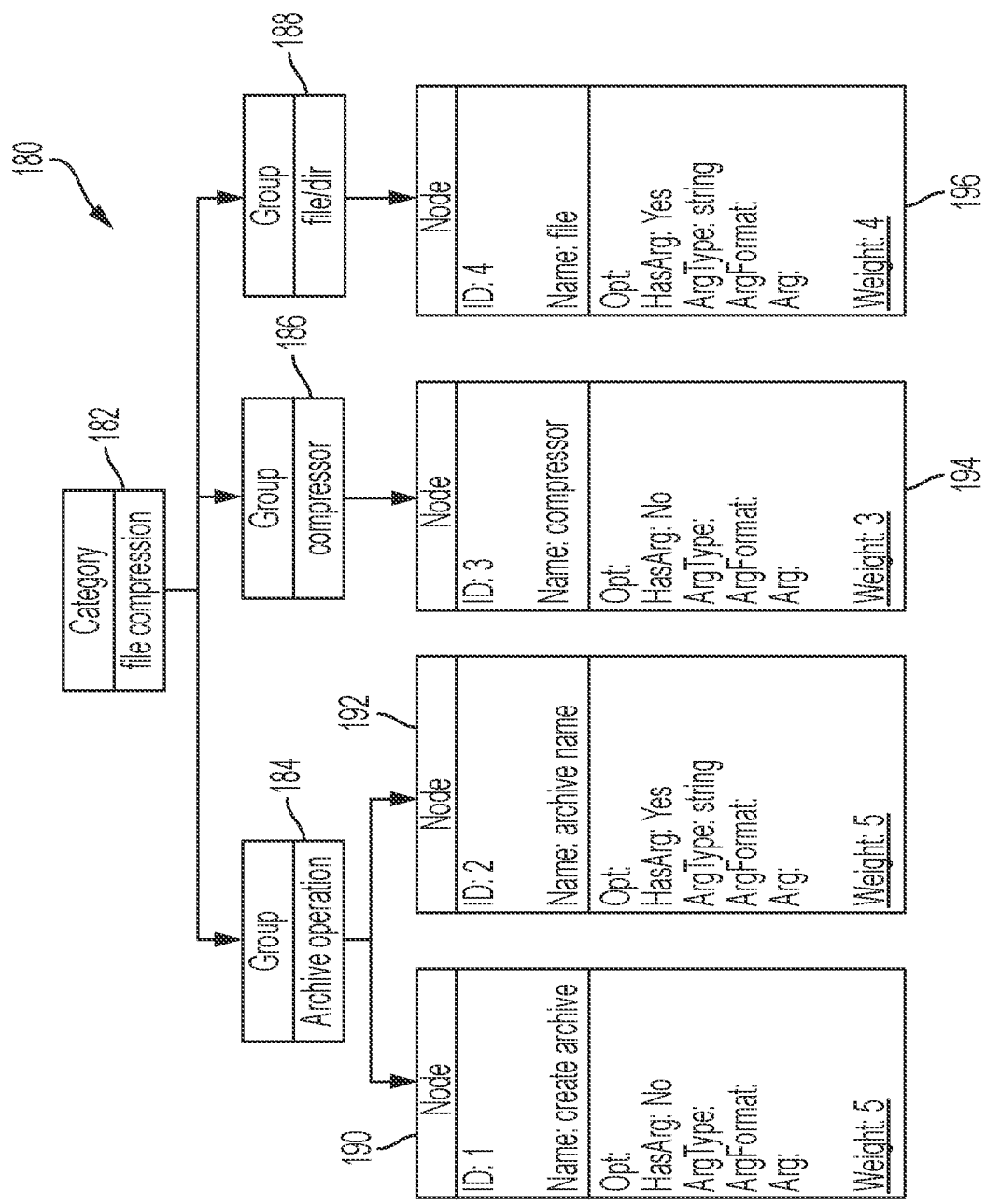
FIG. 11 depicts an example of a UIRF used to perform a translation of a user's entered command, in accordance with one or more embodiments of the present invention.
Figure 12:
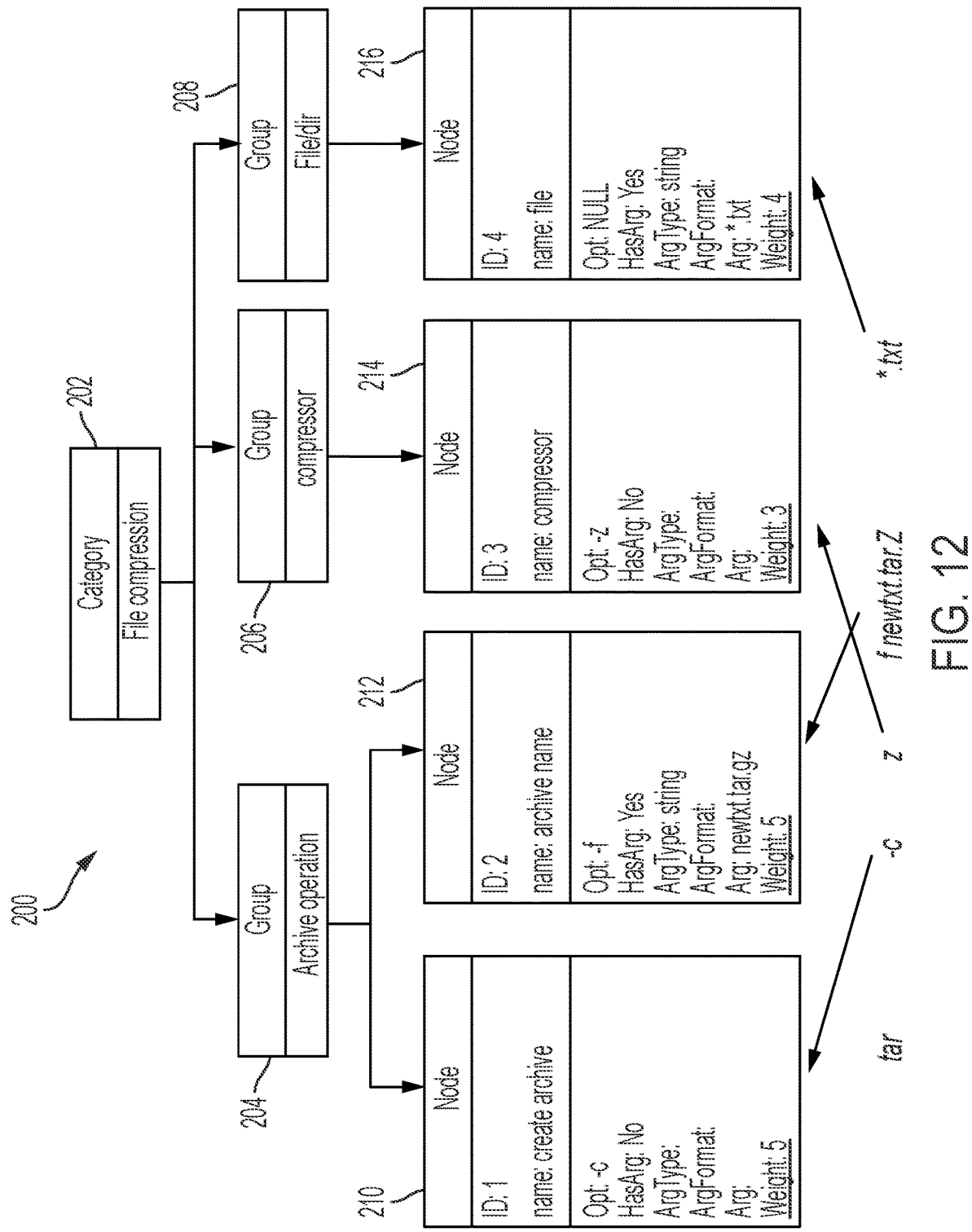
FIG. 12 depicts an example of a first (UUIRF) created for an example of a command entered in a first format, in accordance with one or more embodiments of the present invention.
Figure 13:
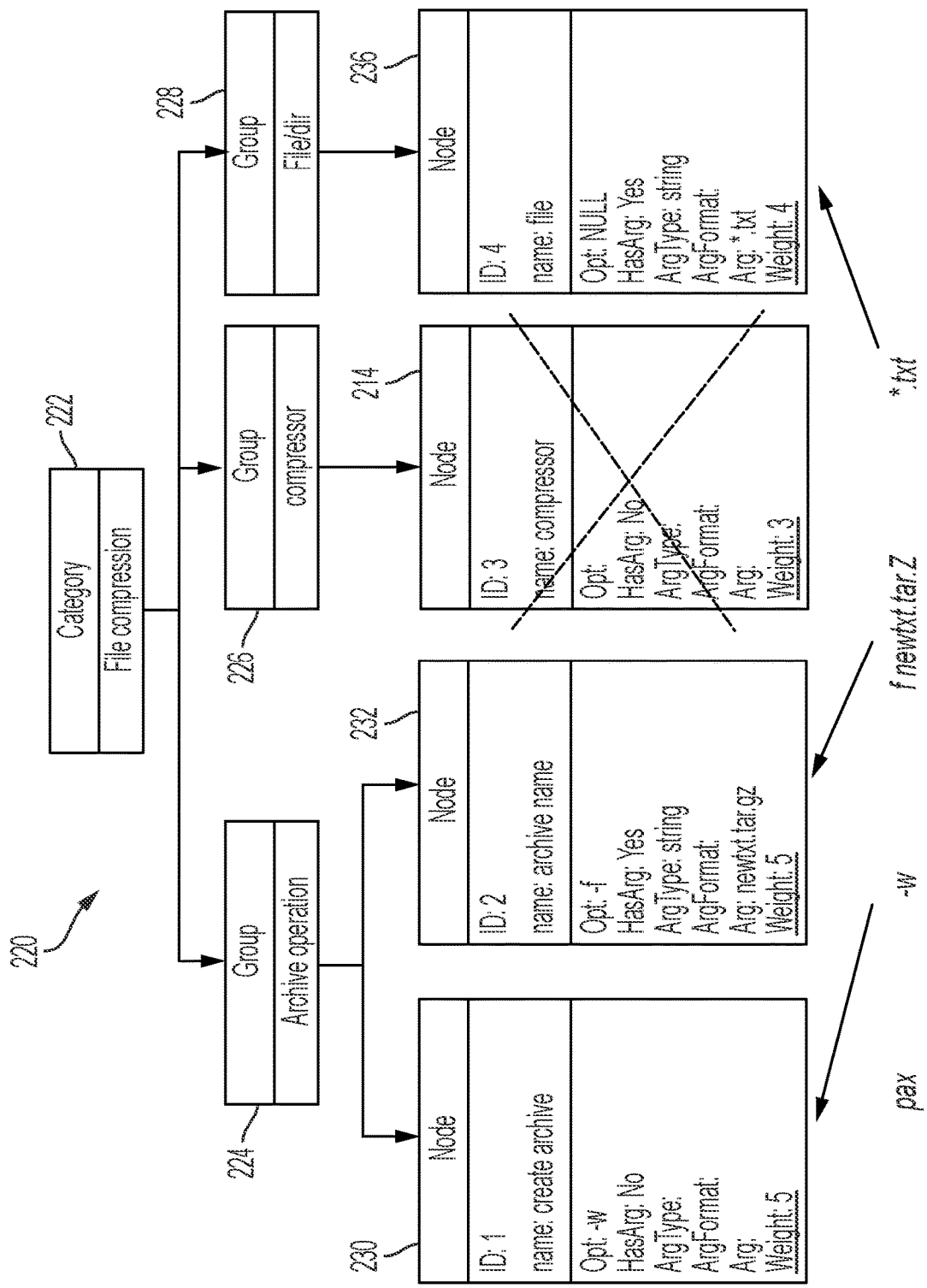
FIG. 13 depicts an example of a target UUIRF created to transform the command of FIGS. 11 and 12 into a target format, in accordance with one or more embodiments of the present invention.

FIGS. 11-13 depict another example of the method 100, and also depicts an example of an analysis performed by the computer system to determine the effectiveness or completeness of a command translation. Generally, the analysis is provided to determine the extent to which the intentions of an entered command are accurately represented and conveyed by a target command.

In this example, the command is a tar command as follows:
tar -cZf newtxt.tar.Z *.txt.
This command is in the tar format and has the intention to package all the txt files with a compression algorithm "-Z", which is supported by the tar format. As noted below, this compression algorithm is not supported by the pax format.

Referring to FIG. 11, the processor acquires a UIRF 180, which includes a category layer having a category element 182, and a group layer having group elements 184, 186 and 188. The UIRF 180 includes node templates for various command elements (atomic units). In this example, the node layer includes a create archive node template 190, an archive name node template 192, a compressor node template 194, and a file node template 196.

As shown in FIG. 12, based on the UIRF 180, a tar UUIRF 200 is created by populating appropriate node templates with command information from the tar command. The UUIRF 200 includes a category element 202 corresponding to the UIRF category element 182, and includes a group layer having group elements 204, 206 and 298 corresponding to UIRF group elements 184, 186 and 188.

The node layer of the tar UUIRF 200 is generated by entering command elements into respective node templates to create node instances for each command element, and thereby generating a tar UUIRF.

For example, the "-c" option (indicating creating a new archive) is populated to create a create archive node 210, the command element "-Z" is entered to create a compression node 214, and the command element "-f newtxt.tar.Z" is entered to create an archive name node 212. A file type node 216 is created by entering the command element for file type, i.e., the command element "*.txt".

Referring to FIG. 13, to translate the tar command into a corresponding pax command, a pax UUIRF 220 is created by extracting information from the tar UUIRF 200. The pax UUIRF 220 includes a category element 222 corresponding to the UIRF category elements 182 and 202. The pax UUIRF 220 also includes a group layer having group elements 224, 226 and 228. The group element 224 corresponds to group elements 184 and 204, the group element 226 corresponds to group elements 186 and 206, and the group element 228 corresponds to group elements 188 and 208.

The pax UUIRF 220 also includes nodes 230, 232 and 236, which are created by correlating nodes in the tar UUIRF 200 with command elements in the pax format. In this example, the pax format option "-w" is correlated with node 230, the pax command element associated with archive naming is correlated with node 232, and the pax file type element "*.txt" is correlated with node 236. In this way, the intention of the tar command is represented in the pax UUIRF 220, and the pax UUIRF 220 can be used to create the pax command:
pax -wf newtxt.tar.Z *.txt.

As shown, each node template and associated tar and pax node is populated with a weight value indicating the importance or priority of the associated command element. In this example, the node template 190 has a weight value of 5, the node template 192 has a weight value of 5, the node template 194 has a weight value of 3, and the node template 196 has a weight value of 4. Likewise, the nodes 210 and 230 have a weight value of 5, the nodes 212 and 232 have a weight value of 5, the node 214 has a weight value of 3, and the nodes 216 and 236 have a weight value of 4, The entered command is in the tar format and has the intention to package the txt file with a compression algorithm "-Z", which is supported by the tar format, but is not supported by the pax format. As a result, when using the UIRF 180 to create the pax UUIRF 220, there is no node instance corresponding to the node template 194.

To evaluate the translation, the weight values are combined to generate a translation score. For example, the score is calculated as follows:

$$(5+5+4)/(5+5+3+4)=82\%$$

Based on the score, the system 10 can determine whether or not to accept the translations. For example, if the score is below a threshold (e.g., 100%), the system 10 can return a notification to the user that the translation was not successful. In addition, or alternatively, if the score is below a threshold, the processing device can improve the IRF, e.g., to improve categorization.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments of the invention, various functions or acts can take place at a given location and/or in connection with the operation of one or more apparatuses or systems. In some embodiments of the invention, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments of the invention were chosen and described in order to best explain the principles of the disclosure and the practical application, and to enable others of ordinary skill in the art to understand the disclosure for various embodiments of the invention with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. A\

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of translating a first command to a target command, the method comprising:
    receiving, by a processor, the first command entered into a command line tool in a first command format via a user interface, the first command requesting an operation, the processor configured to translate the first command into the target command, the target command configured to request the operation and having a target format;
    acquiring a first utility intermediate representation framework (UIRF) corresponding to the command line tool, the first UIRF including a plurality of a first set of node instances, wherein a command element associated with the first command format is representable by one or more node instances of the plurality of the first set of node instances;
    acquiring a first user utility intermediate representation framework (UUIRF) by parsing the first command into one or more command elements, and representing each command element of the one or more command elements by a respective node instance of the first set of node instances of the first UIRF, the first UUIRF representing an intention of the first command;
    acquiring a target UUIRF, the target UUIRF based on the target format, the target UUIRF including a target set of node instances;
    entering information from each of the first set of node instances of the first UUIRF into a corresponding node instance of the target set of node instances in the target UUIRF; and
    constructing the target command based on the target UUIRF, the target command representing the intention of the first command.

2. The method of claim 1, further comprising acquiring an intermediate representation framework (IRF) organized in a plurality of layers, the IRF including an IRF node layer having one or more node templates, wherein the first set of node instances and the second set of node instances are selected based on the one or more node templates.

3. The method of claim 2, wherein the IRF is configured to organize the set of command line tools according to a category layer, a group layer, and the IRF node layer.

4. The method of claim 1, wherein each node instance of the first set of node instances represents an atomic unit of the first command, and each node instance of the second set of node instances represents an atomic unit of the target command.

5. The method of claim 1, wherein the first UIRF includes a node instance for each command option of the first command.

6. The method of claim 1, further comprising analyzing an effectiveness of the translating based on comparing the first set of node instances to the second set of node instances.

7. The method of claim 6, wherein each of the first set of node instances and the second set of node instances is assigned a weight value, and the analyzing includes computing a translation score based on the weight values.

8. A system for translating a first command to a target command, the system comprising:
    a memory having computer readable instructions; and
    one or more processors for executing the computer readable instructions, the computer readable instructions controlling the one or more processors to perform operations comprising:
        receiving, by a processor, the first command entered into a command line tool in a first command format via a user interface, the first command requesting an operation, the processor configured to translate the first command into the target command, the target command configured to request the operation and having a target format;

acquiring a first utility intermediate representation framework (UIRF) corresponding to the command line tool, the first UIRF including a plurality of a first set of node instances, wherein a command element associated with the first command format is representable by one or more node instances of the plurality of the first set of node instances;

acquiring a first user utility intermediate representation framework (UUIRF) by parsing the first command into one or more command elements, and representing each command element of the one or more command elements by a respective node instance of the first set of node instances of the first UIRF, the first UUIRF representing an intention of the first command;

acquiring a target UUIRF, the target UUIRF based on the target format, the target UUIRF including a target set of node instances;

entering information from each of the first set of node instances of the first UUIRF into a corresponding node instance of the target set of node instances in the target UUIRF; and constructing the target command based on the target UUIRF, the target command representing the intention of the first command.

9. The system of claim 8, the operations further comprising acquiring an intermediate representation framework (IRF) organized in a plurality of layers, the IRF including an IRF node layer having one or more node templates, wherein the first set of node instances and the second set of node instances are selected based on the one or more node templates.

10. The system of claim 9, wherein the IRF is configured to organize the set of command line tools according to a category layer, a group layer, and the IRF node layer.

11. The system of claim 8, wherein each node instance of the first set of node instances represents an atomic unit of the first command, and each node instance of the second set of node instances represents an atomic unit of the target command.

12. The system of claim 8, wherein the first UIRF includes a node instance for each command option of the first command.

13. The system of claim 8, further comprising analyzing an effectiveness of the translating based on comparing the first set of node instances to the second set of node instances.

14. The system of claim 13, wherein each of the first set of node instances and the second set of node instances is assigned a weight value, and the analyzing includes computing a translation score based on the weight values.

15. A computer program product comprising a computer readable storage medium having program instructions embodied therewith, the program instructions executable by one or more processors to cause the one or more processors to perform operations comprising:

receiving, by a processor, the first command entered into a command line tool in a first format via a user interface, the first command requesting an operation, the processor configured to translate the first command into the target command, the target command configured to request the operation and having a target format;

acquiring a first utility intermediate representation framework (UIRF) corresponding to the command line tool, the first UIRF including a plurality of a first set of node instances, wherein a command element associated with the first command format is representable by one or more node instances of the plurality of the first set of node instances;

acquiring a first user utility intermediate representation framework (UUIRF) by parsing the first command into one or more command elements, and representing each command element of the one or more command elements by a respective node instance of the first set of node instances of the first UIRF, the first UUIRF representing an intention of the first command;

acquiring a target UUIRF, the target UUIRF based on the target format, the target UUIRF including a target set of node instances;

entering information from each of the first set of node instances of the first UUIRF into a corresponding node instance of the target set of node instances in the target UUIRF; and constructing the target command based on the target UUIRF, the target command representing the intention of the first command.

16. The computer program product of claim 15, the operations further comprising acquiring an intermediate representation framework (IRF) organized in a plurality of layers, the IRF including an IRF node layer having one or more node templates, wherein the first set of node instances and the second set of node instances are selected based on the one or more node templates.

17. The computer program product of claim 15, wherein each node instance of the first set of node instances represents an atomic unit of the first command, and each node instance of the second set of node instances represents an atomic unit of the target command.

18. The computer program product of claim 15, wherein the first UIRF includes a node instance for each command option of the first command.

19. The computer program product of claim 15, further comprising analyzing an effectiveness of the translating based on comparing the first set of node instances to the second set of node instances.

20. The computer program product of claim 19, wherein each of the first set of node instances and the second set of node instances is assigned a weight value, and the analyzing includes computing a translation score based on the weight values.

* * * * *